(12) United States Patent
Will

(10) Patent No.: US 7,495,889 B2
(45) Date of Patent: Feb. 24, 2009

(54) PROCESS FOR MANUFACTURING AN ELECTROCHEMICAL CELL AND AN ELECTROCHEMICAL CELL

(75) Inventor: Norbert Will, Heidenheim (DE)

(73) Assignee: EPCOS AG (DE)

( * ) Notice: Subject to any disclaimer, the term of this patent is extended or adjusted under 35 U.S.C. 154(b) by 185 days.

(21) Appl. No.: 11/329,961

(22) Filed: Jan. 11, 2006

(65) Prior Publication Data

US 2006/0168787 A1 Aug. 3, 2006

Related U.S. Application Data

(63) Continuation of application No. PCT/DE2004/001460, filed on Jul. 7, 2004.

(30) Foreign Application Priority Data

Jul. 15, 2003 (DE) .................. 103 32 093

(51) Int. Cl.
H01G 2/10 (2006.01)
H01G 9/08 (2006.01)

(52) U.S. Cl. ..................... 361/517; 361/535

(58) Field of Classification Search ......... 361/517–521, 361/535–539
See application file for complete search history.

(56) References Cited

U.S. PATENT DOCUMENTS

| | | | |
|---|---|---|---|
| 3,204,164 A | 8/1965 | Burke et al. | |
| 3,250,969 A | 5/1966 | Fanning | |
| 3,852,117 A | 12/1974 | Fraioli | |
| 4,245,277 A * | 1/1981 | van Gils et al. | 361/521 |
| 4,546,415 A | 10/1985 | Kent et al. | |
| 4,691,550 A | 9/1987 | Dietzel | |
| 4,987,518 A | 1/1991 | Dain | |
| 6,310,764 B1 | 10/2001 | Will et al. | |
| 6,507,481 B2 * | 1/2003 | Minato et al. | 361/517 |
| 6,556,426 B1 | 4/2003 | Will | |
| 6,707,661 B2 | 3/2004 | Ebel et al. | |
| 2004/0246652 A1 | 12/2004 | Will et al. | |
| 2005/0094352 A1 * | 5/2005 | Komatsu et al. | 361/504 |

FOREIGN PATENT DOCUMENTS

| | | |
|---|---|---|
| DE | 7230947 | 8/1972 |
| DE | 2805644 | 8/1979 |
| DE | 3247336 A1 | 6/1984 |
| DE | 199 29 597 A1 | 1/2001 |
| DE | 19929598 A1 | 1/2001 |
| DE | 100 16 866 C2 | 3/2002 |
| DE | 101 52 342 A1 | 5/2003 |

(Continued)

*Primary Examiner*—Eric Thomas
(74) *Attorney, Agent, or Firm*—Mayback & Hoffman, P.A.; Gregory L. Mayback; Scott D. Smiley

(57) ABSTRACT

A method for manufacturing an electrochemical cell first includes providing a cup-shaped housing with at least one first indentation. Thereafter, an electrode stack is placed in the housing and then, the first indentation is indented further in a direction towards the inside of the housing by a applying a force on the housing laterally to the first indentation, during which the electrode stack becomes fixed in the housing. As a result, electrode stacks can be fixed particularly easily and reliably in cup-shaped housings. An electrochemical cell is also provided.

8 Claims, 8 Drawing Sheets

FOREIGN PATENT DOCUMENTS

| | | |
|---|---|---|
| EP | 0129714 A2 | 1/1985 |
| EP | 0193589 B1 | 4/1989 |
| FR | 2469226 | 5/1981 |
| JP | 5-217805 | 8/1993 |
| JP | 10-22177 | 1/1998 |
| JP | 11-283869 | 10/1999 |

* cited by examiner

PROCESS FOR MANUFACTURING AN ELECTROCHEMICAL CELL AND AN ELECTROCHEMICAL CELL

CROSS-REFERENCE TO RELATED APPLICATION

This is a continuing application, under 35 U.S.C. § 120, of copending international application No. PCT/DE2004/001460, filed Jul. 7, 2004, which designated the United States; this application also claims the priority, under 35 U.S.C. § 119, of German patent application No. 103 32 093.8, filed Jul. 15, 2003; the prior applications are herewith incorporated by reference in their entirety.

BACKGROUND OF THE INVENTION

Field of the Invention

Many electrochemical cells, e.g., capacitors, batteries, or accumulators have a cup-shaped casing in which a stack of electrodes is located. The electrode stack generally is of flat, positively and negatively charged electrode plates that can be isolated from one another, for example, by a separator layer. The electrodes are in contact with an electrolyte. In the case of electrolytic capacitors, e.g., aluminum electrolytic capacitors, the electrodes often include an aluminum cathode foil and an anode foil of aluminum that has an oxide layer that acts as a dielectric. Between the foils, there is a spacer, e.g., single-layer or multi-layer paper that is impregnated with an electrolyte solution. The configuration is normally in the form of a coil wound around a mandrel, which is placed in the cup-shaped casing. Often, a lid on which the electrical terminals are located closes the cup-shaped casing at the top. Especially in the case of electrolytic capacitors, the terminals can be electrically connected to the capacitor winding, e.g., by metal strips.

The electrochemical cells described are often used in automotive applications, e.g., in automobiles. There, these cells are subject to very strong mechanical vibrations. In the case of very high vibration stress, the electrode stack may also undergo relative movements to the cup-shaped casing. When this happens, it is possible that the electrodes of the electrode stack are damaged or that the electrical connections, e.g., the metal strips between the outer electrical terminals and the electrode stack, get broken or damaged.

German Published, Non-Prosecuted Patent Application DE 199 29 598 A1, corresponding to U.S. Pat. No. 6,310,764 to Will et al., specifies an electrolyte capacitor with a high ability to bear oscillation load. The capacitor has connecting strips between the capacitor coil and the two electrical connections, with the connecting strips taking up a majority of the forces that strain the entire capacity on the capacitor coil during vibration. In addition, the capacitor coil in the housing can be further fixed by generating middle beads in the housing that additionally fix the capacitor coil after the coil has been inserted. These middle beads are created subsequently, e.g., by indenting with a stamping die. This, however, makes the housing longer, so that a reduced axial tensioning of the capacitor coil between the cover and the housing bottom results.

SUMMARY OF THE INVENTION

It is accordingly an object of the invention to provide a process for manufacturing an electrochemical cell as well as the electrochemical cell that overcome the hereinafore-mentioned disadvantages of the heretofore-known devices and methods of this general type and that provides a method for manufacturing an electrochemical cell that works around the aforementioned disadvantages.

With the foregoing and other objects in view, there is provided, in accordance with the invention, a method for manufacturing an electrochemical cell, including the steps of (A) providing a cup-shaped housing with at least one first side indentation, the housing defining an interior, (B) thereupon inserting an electrode stack in the interior of the housing, and (C) then, fixing the electrode stack in the housing by indenting the first indentation further towards an inside of the housing with a force on the housing, the force acting laterally to the first indentation.

In accordance with another mode of the invention, the housing has a main axis and the force in step (C) is applied substantially perpendicular to the first indentation and parallel to the main axis of the housing.

In accordance with a further mode of the invention, the cup-shaped housing is provided with a border and applying the force on the border.

In accordance with an added mode of the invention, there is provided the step (D) after step C), of placing a lid at the housing to close the housing.

In accordance with an additional mode of the invention, the housing defines an opening and, before step (C), a lid is positioned in the opening of the housing and, after step (C), firmly joined the housing to the lid.

In accordance with yet another mode of the invention, a flat contact area is generated in step (C) between the first indentation and the electrode stack.

In accordance with yet a further mode of the invention, the first indentation in step (A) is created with an average width in cross-section that is at least three times as much as an average depth of the first indentation.

In accordance with yet an added mode of the invention, in step A), the first indentation is created with an average wall thickness that is smaller than an average wall thickness of a remaining portion of the housing.

In accordance with yet an additional mode of the invention, in step (A), the first indentation is created with respective areas nearest to the electrode stack having a wall thickness approximately equal to a wall thickness of areas of the first indentation further removed from the electrode stack.

In accordance with again another mode of the invention, in step (A), the first indentation is formed as an indentation traversing around a periphery of the housing.

In accordance with again a further mode of the invention, the housing defines an opening and, in step (A), an additional second indentation is formed in an area of the opening of the housing, the area having an average wall thickness greater than an average wall thickness of the first indentation.

In accordance with again an added mode of the invention, the first indentation in step (A) is generated with a flank having an angle of inclination greater than a corresponding angle of inclination of the second indentation.

In accordance with again an additional mode of the invention, before step (C), an additional part is positioned at least partially in the first indentation and the additional part is fastened in step (C) by applying the force on the housing simultaneously to fixing the electrode stack.

In accordance with still another mode of the invention, at least one of a cooling fin, a fastening device, and an additional current conductor is fastened on the housing as the additional part.

In accordance with still a further mode of the invention, the housing defines an opening and an additional second indentation is formed in step (A) in an area of the opening of the housing, the housing is closed with a lid between steps (B) and (C), and, in step (C), a compressing tool is positioned in the second indentation and the first indentation is compressed by applying the force on the compression tool.

In accordance with still an added mode of the invention, a capacitor coil is provided with two aluminum foils in contact with an electrolyte as electrodes and a separator therebetween and an aluminum electrolyte capacitor is produced by providing the capacitor coil as the electrode stack in step (B).

With the objects of the invention in view, there is also provided a method for manufacturing an electrochemical cell, including the steps of providing at least one first side indentation at a cup-shaped housing defining an interior, inserting an electrode stack in the interior of the housing, and fixing the electrode stack in the housing by applying a force lateral to the first indentation to, thereby, indent the first indentation further towards the interior of the housing.

In accordance with still an additional mode of the invention, the fixing step is carried out by applying a force perpendicular to an indentation direction of the first indentation on the housing.

In accordance with another mode of the invention, the housing has a main axis, and the force is applied substantially perpendicular to the first indentation and parallel to the main axis of the housing.

In accordance with a further mode of the invention, the housing has a side wall and, in step (A), at least one first lateral indentation is provided in the side wall at a location that, after insertion of the electrode stack in step (B), is opposite the electrode stack.

In accordance with an added mode of the invention, the force is applied in step (C) to only have farthest indented areas of the first indentation contact the electrode stack.

In accordance with an additional mode of the invention, the first indentation is provided with a base and the force is applied in step (C) to only have at least a portion of the base contact the electrode stack.

In accordance with yet another mode of the invention, the first indentation is provided with two flanks and action of the force in step (C) is ended before the two flanks of the first indentation touch each other.

With the objects of the invention in view, there is also provided an electrochemical cell, including a cup-shaped housing defining an interior, an electrode stack disposed in the interior of the housing, and the housing having at least a first indentation fixing the electrode stack in the interior, the first indentation having flanks with an average wall thickness $d_{mean}$, with:

$$d_{mean} > a_{mean} \cdot \cos \alpha$$

where:

$a_{mean}$ is an average wall thickness of remaining portions of the housing; and $\alpha$ is an angle of inclination of the flanks.

In accordance with yet a further feature of the invention, the angle of inclination $\alpha$ of the flank is greater than 50°.

In accordance with yet an added feature of the invention, the angle of inclination $\alpha$ of at least one of the flanks is greater than 50°.

In accordance with yet an additional feature of the invention, the angle of inclination is greater than 90°.

In accordance with again another feature of the invention, the housing and the electrode stack form an aluminum electrolyte capacitor, the electrode stack is a capacitor coil having a separator, an electrolyte, and two aluminum foils as electrodes, and the electrodes are isolated from one another by the separator and are in contact with the electrolyte.

In accordance with again a further feature of the invention, the flanks of the first indentation are at a distance from one another.

In accordance with again an added feature of the invention, the distance of the flanks from one another increases with increasing distance from the electrode stack.

In accordance with a concomitant feature of the invention, the housing defines an opening and has a housing bottom, a lid closes the opening of the housing, and the electrode stack is fixed between the lid and the housing bottom.

Other features that are considered as characteristic for the invention are set forth in the appended claims.

Although the invention is illustrated and described herein as embodied in a process for manufacturing an electrochemical cell as well as the electrochemical cell, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

A method according to the invention for manufacturing an electrochemical cell is by a method step A), where a cup-shaped housing with at least a first indentation is provided. Thereafter, an electrode stack is inserted in the housing in a method step B) and finally, in a method step C), by a force that acts laterally to the first indentation on the housing, the first indentation is indented further in the direction of the inner part of the housing, during which the electrode stack is fixed in the housing.

The method according to the invention has the advantage that the force does not act directly on the indentation, as might be the case, for example, when stamping by the aforementioned die takes place. Instead, the force acts indirectly above the housing, which results in a compression of the first indentation, correspondingly resulting in fixing of the electrode stack in the housing. In contrast to traditional methods, in which e.g., dies are used, in the method according to the invention, the length of the housing is not increased, but rather, shortened, so that, apart from the good radial tensioning because of the first indentation, an improved axial tensioning of the electrode stack between the lid and the bottom of the housing can also be achieved. Another advantage of the method according to the invention is that, due to the indirect application of force on the first indentation, the maximum possible forces act in a limited manner on the electrode stack in method step C) so that, under unfavorable conditions, there is a lesser danger of the electrode stack getting damaged during the fixing process.

Figure 2A:
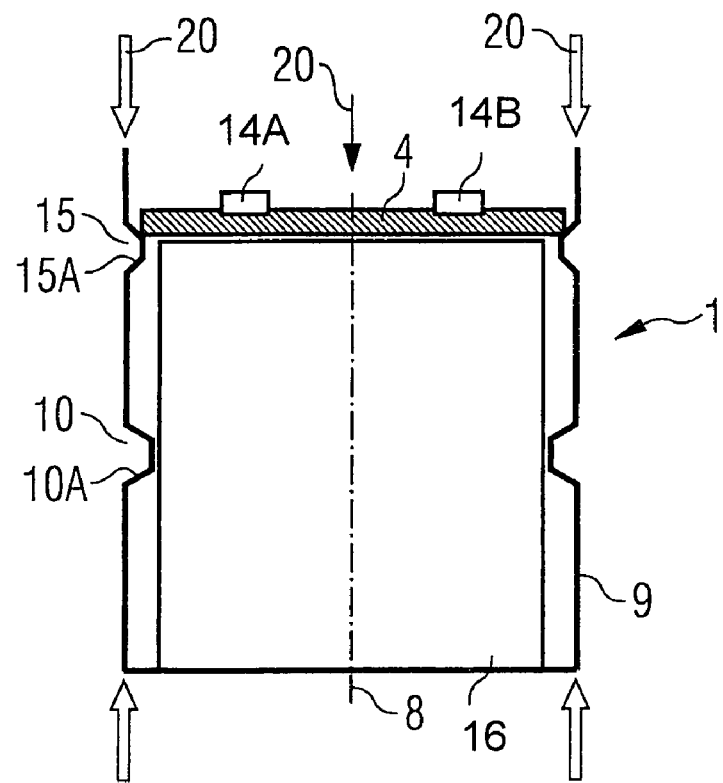
FIG. 2A is a fragmentary, cross-sectional view of a cell with at least one bead to be manufactured according to the method of the present invention.

It is advantageous, in method step C), that the force should be exerted substantially perpendicular to the first indentation and parallel to the main axis of the housing (see, for example, FIG. 2A). In case of exerting a force along this direction, it is particularly easily possible and advantageous to use the first indentation by compression for fixing the electrode stack.

In method step C), the force can, then, be applied on the border of the cup-shaped housing (see, for example, FIGS. 2A to 2C and 3A to 3C).

In another manifestation of the method according to the invention, it is possible, in an additional method step D), after method step C), to mount a lid that closes the housing. In such a case, the cup-shaped housing, which is open towards the top, is compressed with the electrode stack that has already been inserted, by a force acting laterally to the first indentation, so that the electrode stack is fixed in the housing and, only thereafter, the housing is closed by a lid. Here, in addition to the radial fixing of the electrode stack that is already present, due to the fixing by at least one first indentation, an additional axial clamping between the lid and the housing bottom is achieved advantageously.

In another advantageous variant of the method according to the invention, before method step C), a lid is positioned in the opening of the cup-shaped housing without tightly closing the housing. Only after method step C) (the compression of the first indentation) is the housing closed by the positioned lid. This can be done, for example, by having the peripheral border of the housing bent, i.e., flanged, around an additionally placed sealing ring that seals the lid to the housing (compare, for example, FIGS. 2B and 2C). Then, it is particularly easy, after method step C), to achieve an additional axial clamping of the electrode stack between the housing bottom and the lid.

But it is also possible, for example, in the case of flexible lids in the form of rubber plugs, to close the housing tight immediately after the insertion of the electrode stack and even before the compression in method step C). The electrode stack, then, can be fixed by the axial tensioning between the lid and the housing bottom. Due to its flexibility, the rubber stopper can also compensate for small structural changes in the lid area during the compression process in method step C), so that, as before, the housing is closed tight after the compression process.

Moreover, it is advantageous if, in method step C), a flat contact area is generated between the first indentation and the electrode stack. Due to the particularly large contact area, a particularly good fixing of the electrode stack in the cup-shaped housing results (see, for example, FIG. 3C).

Another advantage in the method according to the invention occurs if, in method step A), the first indentation is created to have an average cross-sectional width that is at least three times as much as its average depth. Such particularly wide indentations are particularly well suited to be compressed by the method according to the invention in method step C), with the large width of these beads providing a particularly good fixing of the electrode stack.

It is also advantageous to generate the first indentation in the method step A), where its average wall thickness is less than the average wall thickness of the remaining housing. The result of such a configuration is that, when the force is applied in method step C), the first indentation is, preferably, indented further, and no other areas of the housing are deformed during the compression process in method step C).

It is favorable to generate, in method step A), the first indentation in the housing such that those areas of the indentation, which, after the insertion of the electrode stack in method step B) are closest to it, have approximately the same wall thickness as those areas of the indentation that are further from the electrode stack. This means that the indentation, which can also be called a bead, has a bead base that comes closest to the electrode stack, which has about the same wall thickness as bead flanks (see, for example, FIGS. 3A to 3C and FIGS. 8A and 8B). An indentation that has approximately the same wall thickness in all the areas can be particularly effectively created, in that, in comparison to the traditional beading process, with an increased application of force in method step A), a die is pressed against the walls of the housing, with an anvil being present as a counterforce. Due to this indenting with an increased application of force, indentations are created, which, in all the areas of the indentation have approximately the same wall thickness. In the case of traditional indenting processes, e.g., by an embossing die, the counterforce in the form of an anvil is often absent, so that beads created in this manner have a greater wall thickness in the bead base than on the bead flank. Such beads, created by the traditional methods, would also result in the areas of cup located close to the bead getting deformed in method step C), so that only a small compression of the first indentation is achieved (see FIGS. 7A and 7B). Indentations with about the same wall thickness in the bead base and the bead flank, in contrast, can be indented further especially easily in method step C) (see FIGS. 8A and 8B).

It is best to produce, in method step A), the first indentation in the form of an indentation running around the periphery of the housing. The advantage of such a configuration is that, due to the particularly large peripheral contact surface between the indentation and the electrode stack, a particularly good fixing is obtained.

Often, in method step A), an additional second indentation can be made in the area of the opening of the housing, whose average wall thickness is greater than the average wall thickness of the first indentation. This second indentation often serves as a so-called resting bead for positioning of the lid (see, for example, FIGS. 2A to 2C). This contact bead has, favorably, a greater wall thickness than the first indentation to ensure that, during the compression process in method step C), only the first indentation is indented further and not the contact bead, the second indentation.

In case of the presence of the second indentation, it is particularly favorable if, in method step A), the angle of inclination of the flank of the first indentation is greater than the corresponding angle of inclination of the second indentation. For determining the angle of inclination, a straight line is drawn, as shown, for example, in FIG. 3C, along the wall of the housing and a tangent along the flank of the indentation. The angle of inclination α is, then, defined by the angle that is included by the two straight lines. A larger angle of inclination of the flanks of the first indentation than the corresponding angle of inclination of the second indentation results in the flanks of the first indentation being steeper than those of the second indentation. The consequence of this is that, during the compression process in method step C), the first indentation, by preference, and not the second indentation, gets compressed. A housing with such first and second indentations can be seen, for example, in FIG. 2A.

In another favorable variant of the method according to the invention, before method step C), at least partially, an additional part can be positioned in the first indentation. This additional part can, then, be fastened to the housing in method step C) together with the fixing of the electrode stack because of the compression of the first indentation, for example, by jamming the part in the indentation. As a result, additional fastening steps for the additional part can be dispensed with, for example, bolting or welding. Fastening of additional parts in the first indentation can be seen, for example, from FIGS. 5A to 5C and 6.

The additional part can, for example, be a cooling fin, which is able to especially easily conduct the heat towards the outside that is generated during the operation of the electrochemical cell. As an additional part, a fastening device, for example, can also be fastened to the housing, which can then be used for a particularly simple fastening of the electrochemical cell on a PCB. Then, as an additional part, an additional electrical conductor can be particularly easily fastened, by using the method according to the invention, in the first indentation on the housing. Such conductors can serve, for example, to realize low-induction electrolyte capacitors, as have been described in the German Published, Non-Prosecuted Patent Application DE 199 29 598 A1, whose contents have been referred to in detail above.

If an additional second indentation is generated as a support bead for the cover in the area of the opening of the housing, it is, for example, also possible to close the housing by a lid between the method steps B) and C). The lid can, then, be made, not only of a flexible material, for example, rubber plug material, but can also, for example, be a metal lid, which air-tightly closes the housing with a sealing ring. Then, in such a configuration, during the method step C), a compression tool can be positioned in the second indentation and, by exerting the force on this compression tool, the first indentation can be compressed in a targeted manner. Thus, using a compression tool, it is possible to prevent the forces from acting simultaneously on the lid area of the housing, which could result in deformation of the lid, with the result that the housing would, then, not, perhaps, be closed in an airtight manner. In the case of a second indentation running around the housing, as a support bead, a compression ring can be used, for example, as the compression tool (see FIG. 4, for example).

By applying the method according to the invention, it is possible to make, for example, an aluminum-electrolyte capacitor, with a capacitor coil being used as the electrode stack. The coil can include two aluminum foils in contact with an electrolyte and a separator located between them.

It is advantageous to end the action of the force in method step C) before the two flanks of the first indentation touch each other. As such, the two flanks of the first indentation still have a distance to one another, as is shown, for example, in FIGS. 2C and 3C. The advantage of this is that the action of the force on the electrode stack can be controlled particularly well and for example, damage to the electrode stack during the method step C) can be particularly well prevented or reduced.

Yet another advantage of variants of the method according to the invention is in the fact that the electrode stack cannot get overloaded in case of wrong settings, e.g., of the applied force in method step C) (excessive exertion of force) or in case of large dimensional tolerances of the electrode stack (diameter of the electrode stack selected to be too big) during the method step C), but that the electrode stack can build up its own counterforces. These counterforces can result in the indentation, for its part, getting at least slightly deformed, and those areas of the flanks of the indentation, which neighbor the non-indented areas of the cup-shaped housing, are formed so that these areas have a greater distance to the electrode stack than the non-indented neighboring areas of the cup-shaped housing. In the case of traditional indentations, the areas of the flanks neighboring the non-indented areas of the housing generally have a smaller distance to the electrode stack (see, for example, FIG. 1).

It is particularly advantageous when the force is exerted so that, apart from the radial clamping of the electrode stack between the walls of the cup-shaped housing by the indentation, an axial clamping of the electrode stack between the housing lid and the cup bottom results because of the compression of the housing. This makes it possible to achieve an all-sided, particularly cost-effective fixing of the electrode stack in the housing.

Furthermore, the invention provides an electrochemical cell in which there is a cup-shaped housing, in which an electrode stack is located. There is at least a first indentation present in the cup-shaped housing and the indentation fixes the electrode stack in the housing. For the average wall thickness $d_{mean}$ of the flanks of the first indentation, the following holds true:

$$d_{mean} > a_{mean} \cdot \cos \alpha$$

where $a_{mean}$ is the average wall thickness of the remaining housing and α is the angle of inclination of the flanks of the first indentation.

The inventor has found that, in the case of beads created by the traditional beading method, the following relationship applies for the average wall thickness:

$$d_{mean} < a_{mean} \cdot \cos \alpha.$$

This is due to the fact that, in the traditional beading methods, in which beading is done, for example, by an indenting knurler, which goes peripherally around the circumference of the housing, the average wall thickness of the flanks of the indentation is reduced, which results in indentations that do not have flanks that are as steep as is the case in the compression process according to the invention in method step C). The result of such a process is that, in the case of traditionally generated indentations, the angle of inclination α of the flanks is smaller than in the case of indentations made by the methods according to the invention. In contrast, in the case of the method according to the invention, during the compression process C), the average wall thickness of the flank of the bead hardly changes, whereas the angle of inclination α increases sharply (see, for example, FIGS. 3A to 3C). Due to its smaller deformation in the area of the housing surrounding the indentation, as well as due to its larger average wall thickness, indentations created by the method according to the invention are stronger than indentations made by the traditional methods with the same angle of inclination so that they are better suited for fixing of electrode stacks in housings.

Figure 3A:
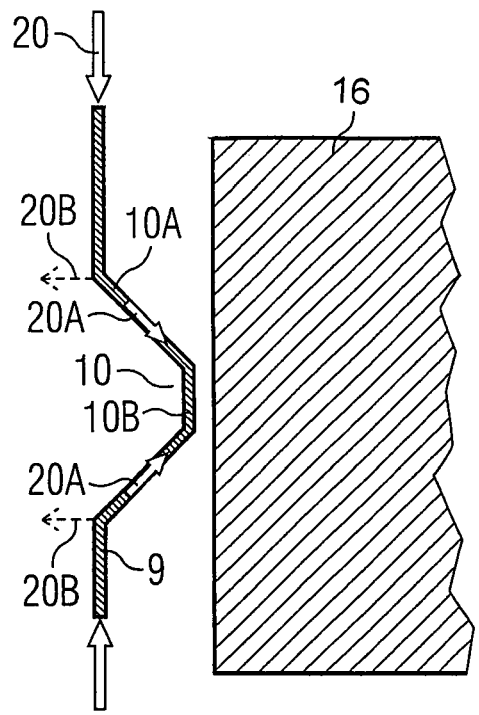
FIG. 3A is a fragmentary, enlarged, cross-sectional view of a portion of the cell of FIG. 2A including a first indentation during a compression process according to the method of the present invention.
Figure 3B:
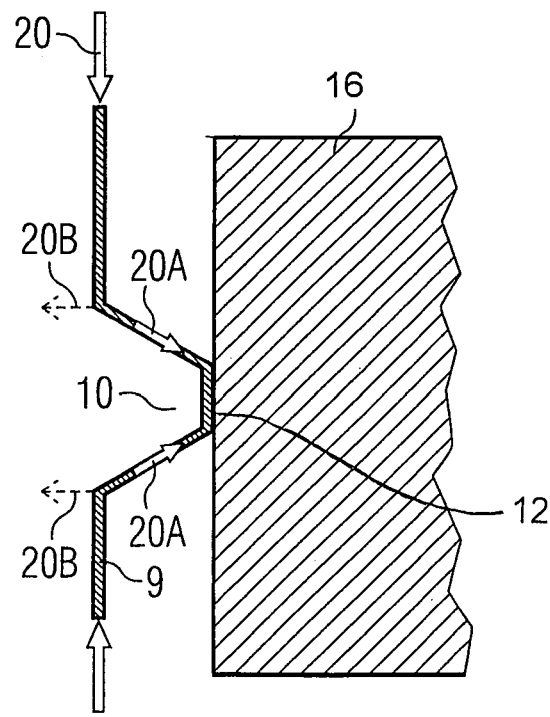
FIG. 3B is a fragmentary, enlarged, cross-sectional view of a portion of the cell of FIG. 2A after the compression process illustrated in FIG. 3A.
Figure 3C:
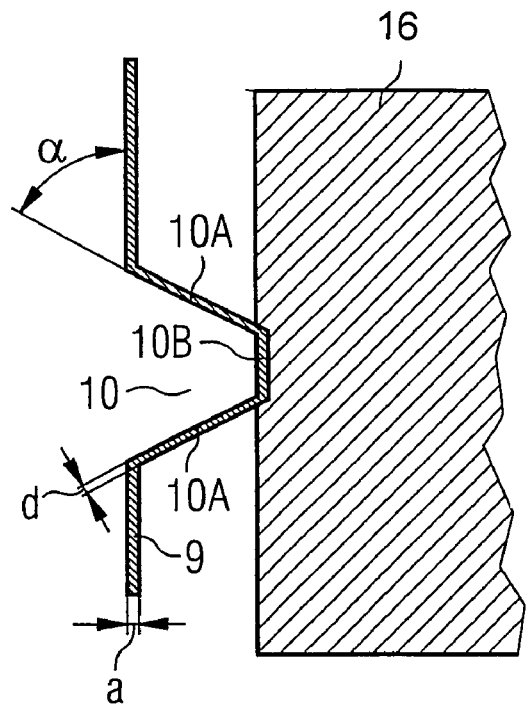
FIG. 3C is a fragmentary, enlarged, cross-sectional view of a portion of the cell of FIG. 2A after the compression process illustrated in FIG. 3B.

Thus, the objectives of the invention also include electrochemical cells in which the angle of inclination α of the flanks of the first indentation is greater than about 50° (see, for example, FIG. 3C). Only by the method according to the invention is it possible to make flanks with such large angles of inclination without this resulting in a deformation or even a fracture of the housing in the area around the bead.

Figure 6:
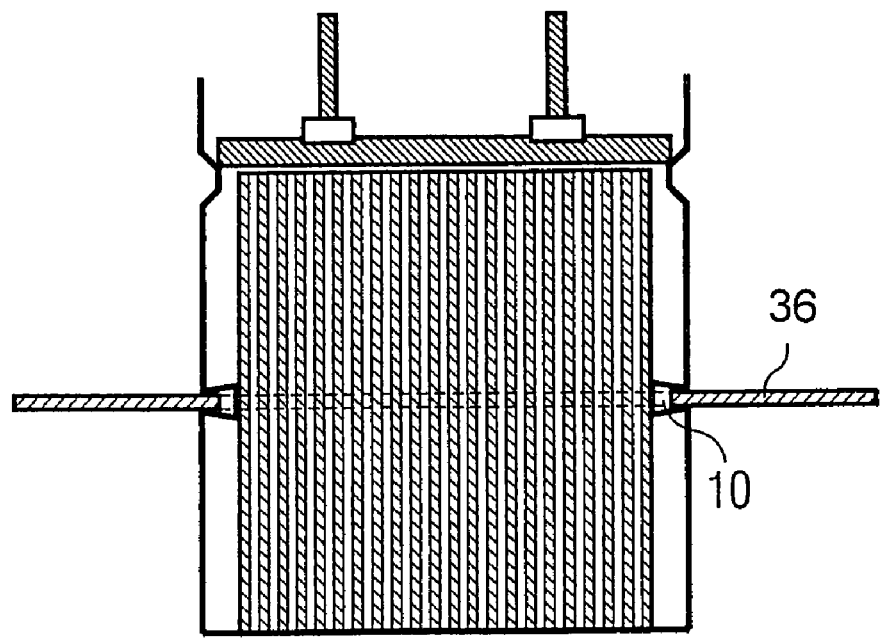
FIG. 6 is a fragmentary, cross-sectional view from the side of a cell with at least one bead to be manufactured with particularly steep flanks according to another embodiment of the method according to the invention that fastens additional parts on the cell.

Electrochemical cells manufactured by the method according to the invention can also have first indentations, in the case of which the angle of inclination α is greater than about 90° (see, for example, FIG. 6). Indentations whose flanks have such large angles of inclination can only be made using the method according to the invention because, in the traditional beading method, the housing could break at such high angles of inclination. First indentations with such large angles of inclination can be of particular advantage, even for the simultaneous fastening of, for example, very thin sheets in the indentations, which could not be fastened by first indentations with smaller angles of inclination (see FIG. 6).

In the case of the electrochemical cells manufactured by the method according to the invention, what can be involved are aluminum electrolyte capacitors, in which the electrode stack is a capacitor coil that has two aluminum foils as electrodes, which are isolated from one another by a separator and are in contact with an electrolyte.

It is advantageous for the flanks of the first indentation to have, in the case of some electrochemical cells, a distance from one another. The flanks do not touch one another. Such indentations are particularly well suited for fixing the electrode stack, but at the same time, without damaging it in such a way that the electrical properties of the electrochemical cell are affected considerably adversely (see, for example, FIGS. 2C and 3C).

In the case of such indentations, the distance of the flanks to one another can increase with increasing distance of the flanks to the electrode stack. Such indentations are particularly flexible and suitable for fixing electrode stacks without excessive damage.

Figure 1:
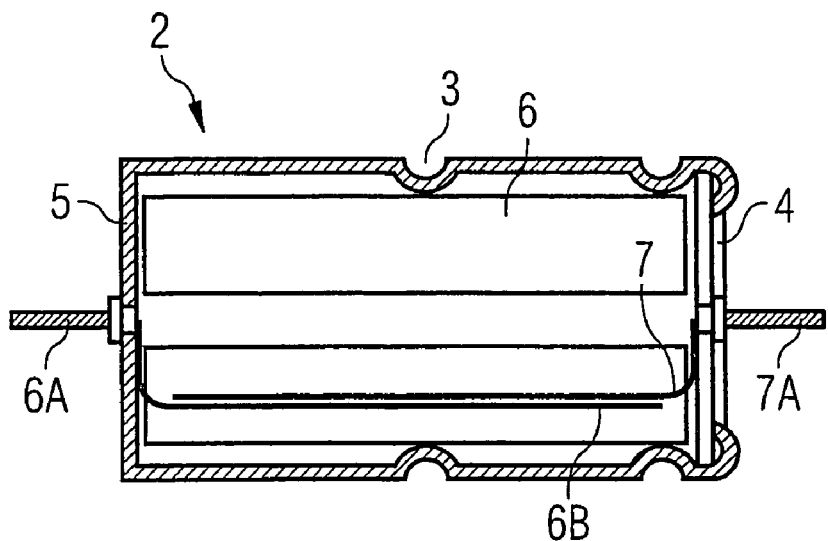
FIG. 1 is a fragmentary, cross-sectional view of a prior art vibration-resistant capacitor.

Referring now to the figures of the drawings in detail and first, particularly to FIG. 1 thereof, there is shown a traditional vibration-resistant capacitor 2, which is described, for example, in German Published, Non-Prosecuted Patent Application DE 199 29 598 A1. The electrical connections 6a or 7a are connected by connecting plates 6B or 7B to the capacitor coil 6, where these connecting plates are supposed to absorb the forces acting on the capacitor or the capacitor coil during a vibration. In addition to these connecting plates 6B, 7B, after the insertion of the capacitor coil 6, so-called middle beads 3 have been generated, which additionally fix the capacitor coil in the housing. During the creation of these middle beads 3, however, the housing gets lengthened along its main axis, because of which the equally important axial tensioning of the capacitor coil 6 between the lid 4 and the cup bottom 5 is reduced. Thus, the retrospective generation of the middle beads 3 results in a reduced axial tensioning of the capacitor coil 6.

FIG. 2A shows an electrochemical cell 1 in cross-section before the method step C) of the method according to the invention. An electrode stack 16 (also referred to in one embodiment as a capacitor coil 16) has been inserted in the cup-shaped housing 9. This cup-shaped housing 9 has a first indentation 10 going around the housing. Moreover, for resting the lid 4 in the area of the opening of the cup-shaped housing 9, there is a second indentation 15. The steepness of the flanks 10A of the first indentation 10 is greater than the corresponding steepness of the flanks 15A of the second indentation 15. The steepness can also be calculated by using the angle of inclination α, which is explained later with respect to FIG. 3C. A force 20 can be applied along the main axis 8 of the electrochemical cell 1 (see arrows). This force 20, then, mainly acts on the borders of the cup-shaped housing and, to a lesser extent, also on the lid 4 (see arrows 20 in different sizes in FIG. 2A). The electrical connections 14A and 14B are also present in the lid 4.

Figure 2B:
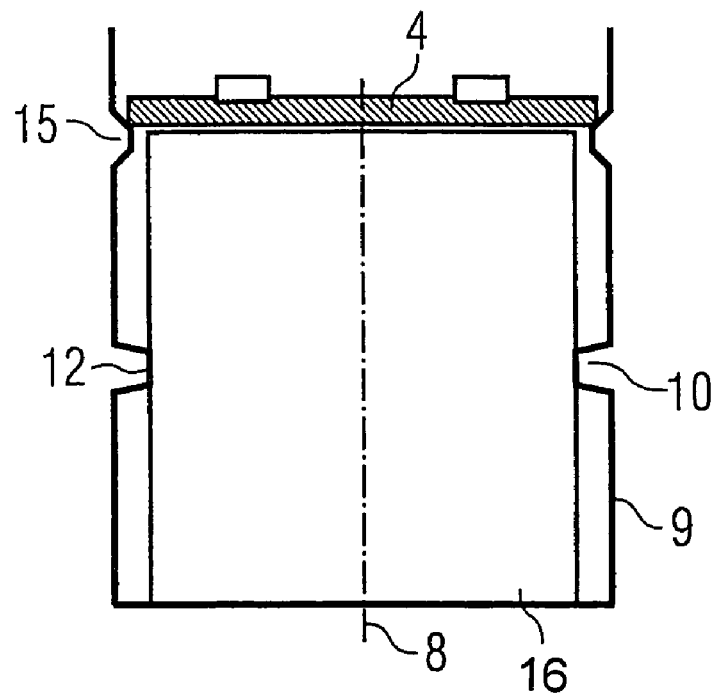
FIG. 2B is fragmentary, cross-sectional view of the cell of FIG. 2A after a force has been imparted on the cell according to a method step of the present invention.

FIG. 2B shows the electrochemical cell of FIG. 2A after method step C), compression. Here, it can be seen that, selectively, the first indentation 10 is compressed further, i.e., was indented, with a contact surface 12 resulting between the first indentation and the capacitor coil 16, which results in fixing of the capacitor coil 16. The second indentation 15 was not compressed by the compressing process in method step C).

Figure 2C:
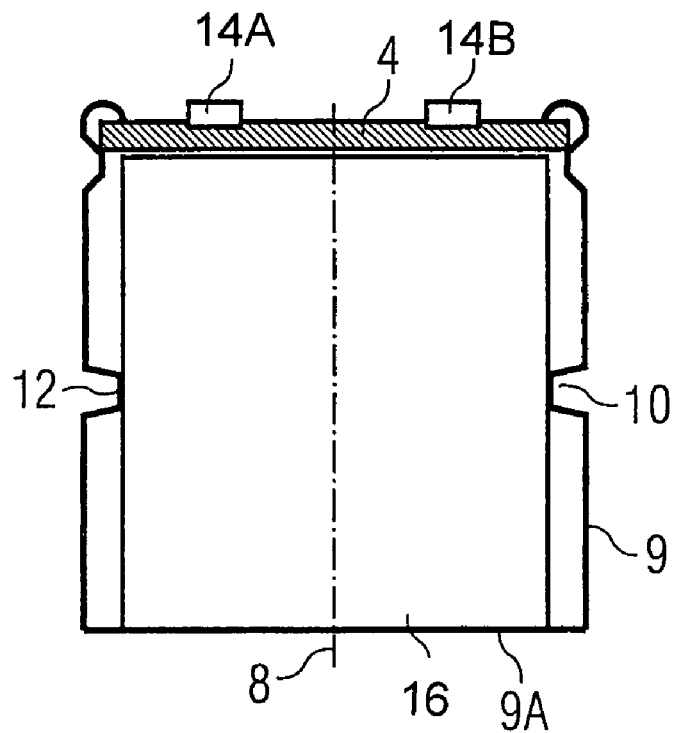
FIG. 2C is fragmentary, cross-sectional view of the cell of FIG. 2B after flanges have been closed on a lid of the cell according to another method step of the present invention.

FIG. 2C shows the electrochemical cell after closing the lid 4. In the closing, the housing is closed tight using the border of the cup-shaped housing 9 that was flanged all around the lid 4. In the case of metal plates as the lid 4, for example, this tight closing can be achieved by sealing rings. However, a rubber stopper can also be used as a lid 4.

During the closing of the lid 4, in addition to the radial stress, an additional axial stress can be built up between lid 4 and the cup bottom 9a, without affecting the radial tensioning of the capacitor coil 16.

FIG. 3A schematically shows the forces that act during the compression process in method step C) on the first indentation 10. The arrows marked with 20 depict the forces acting directly on the housing because of the force described earlier. The first indentation 10 is composed, in the cross-section, of two flanks 10A and a base 10B. The arrows designated as 20A indicate the forces that act on the base 10B of the indentation 10. The dotted arrows designated as 20B indicate the forces resulting from the action of this force, which act on the wall of the cup 9. A part of the capacitor coil 16 is shown next to the first indentation 10 for clarity.

FIG. 3B shows the first indentation 10 of FIG. 3A in cross-section, in which a compression has already taken place due to the force 20. As such, the base 10B of the indentation 10 has formed a contact surface 12 with the capacitor coil 16. What can be seen during this is that, at the same time, the steepness of the flanks 10A of the indentation 10 increases.

FIG. 3C shows the first indentation 10 of FIGS. 3A and 3B after the compression process in method step C). A comparison between the FIGS. 3A and 3C clearly shows that the steepness of the flanks of the first indentation 10 has increased during the compression process. The steepness can then be depicted by the angle of inclination α. This angle of inclination α is obtained upon drawing a straight line along the cup wall not belonging to indentation 10 and, at the same time, drawing a tangent along the flank 10A of the first indentation 10.

This makes it clear that the angle of inclination α has increased during the compression process from FIG. 3A to 3C.

As has already been described above, for an indentation that has been created by using the method according to the invention, the mean wall thickness $d_{mean}$ of its flanks 10A must be greater than the product of the mean wall thickness $a_{mean}$ of the remaining housing and the cosine of the angle of inclination α. The average wall thickness $d_{mean}$ of the flanks 10Aa can, then, be calculated as the mean of the wall thickness d measured at different points of the flank 10A. The mean wall thickness of the remaining housing $a_{mean}$ can, then, be depicted as the average of the actual wall thickness "d" measured at different points of the housing.

Figure 4:
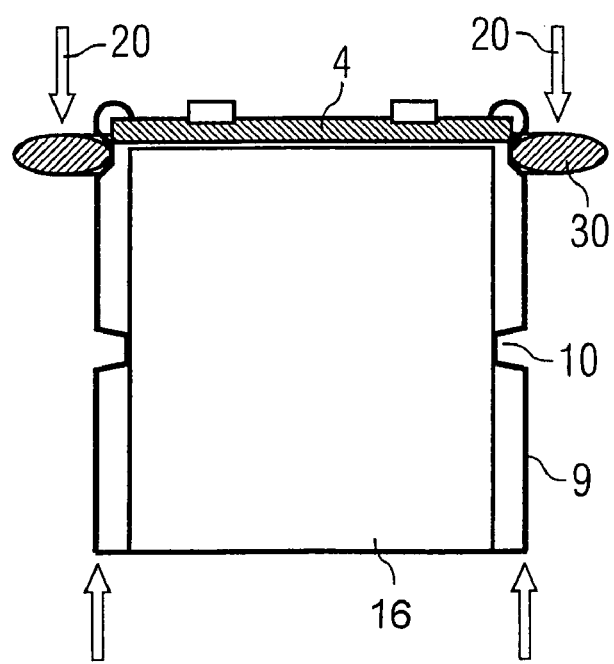
FIG. 4 is a fragmentary, cross-sectional view of a cell with at least one bead to be manufactured according to another embodiment of the method according to the invention.

FIG. 4 shows a variant of the method according to the invention in the cross-section during the method step C), in which a clamping device 30 is used—in the case of a peripheral second indentation, a clamping ring being used additionally—to selectively apply forces 20 on the first indentation 10, without deforming the area of lid 4 while applying these forces 20.

Figure 5A:
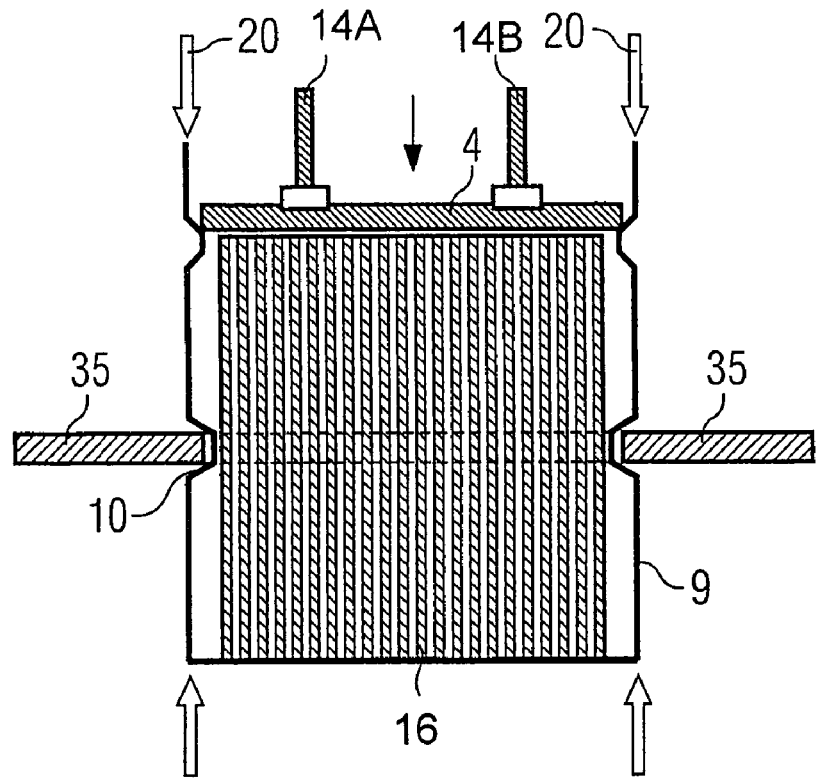
FIG. 5A is a fragmentary, cross-sectional view from the side of a cell with at least one bead to be manufactured according to a further embodiment of the method according to the invention that fastens additional parts on the cell.

FIG. 5A shows another variant of the method according to the invention during method step C). Here, once again, the force 20 is applied on the borders of the cup-shaped housing 9 as well as to a lesser extent on the lid 4. In addition, a plate 35 is positioned as an additional part in the first indentation 10.

Figure 5B:
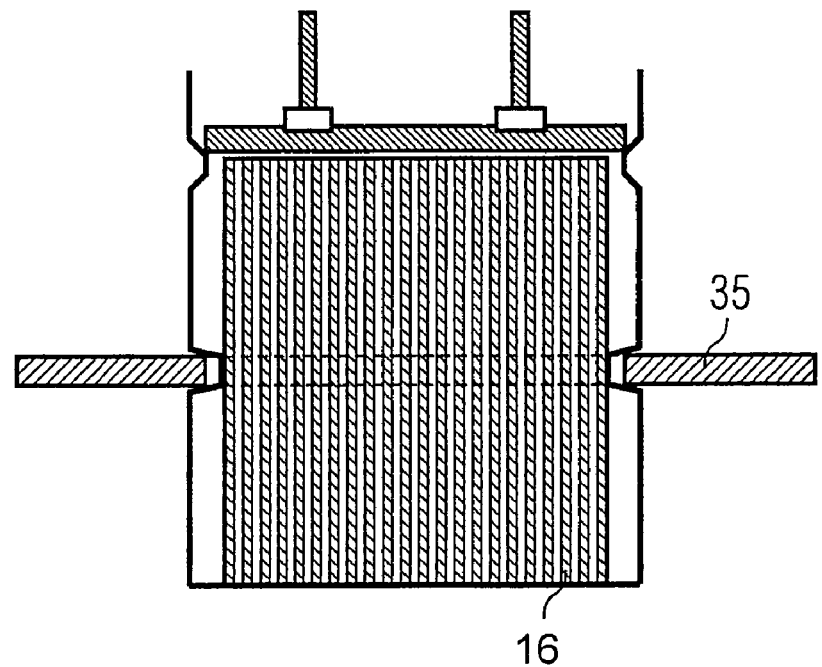
FIG. 5B is a fragmentary, cross-sectional view from the side of the cell of FIG. 5A after a compression step according to the invention.

FIG. 5B shows the electrochemical cell illustrated in FIG. 5A after the method step C). The plate 35 is, then, jammed in the first indentation 10 and, hence, fastened during the compression process of this first indentation 10. At the same time, based upon the compression of the first indentation 10, a radial fixing of the capacitor coil 16 has been realized to a particular advantage.

Figure 5C:
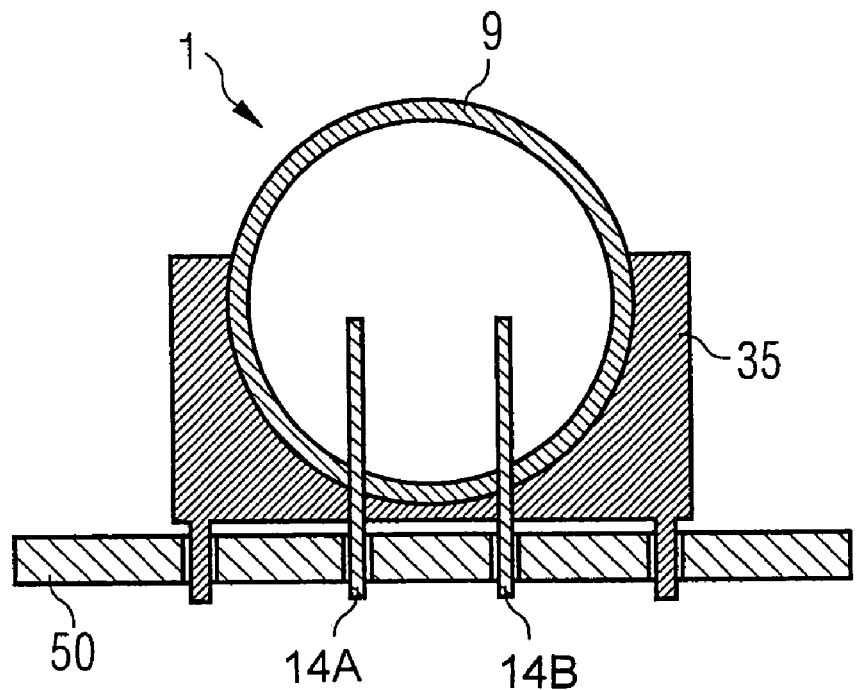
FIG. 5C is a fragmentary, cross-sectional view from an end of the cell of FIG. 5B after the compression step according to the invention and with the additional part in a further board.

FIG. 5C shows a side cross-sectional view of the electrochemical cell 1, on which the additional plate 35 was fastened by the method according to the invention, which, simultaneously, also serves to fasten the cell 1 on a board 50 (for example, a printed circuit board). Also present in FIG. 5C are the electrical contacts 14A and 14B.

FIG. 6 shows a capacitor in cross-section, which was manufactured by the method according to the invention, with a particularly thin sheet 36 being fastened in the first indentation 10 during the compression process in method step C). By applying the method according to the invention, it is also possible to realize indentations 10, whose flanks 10A are so steep that the angle of inclination α is greater than 90°. In the case of indentations made by the traditional method, such angles of inclination can result and have already resulted in fractures of the housing wall.

Figure 7A:
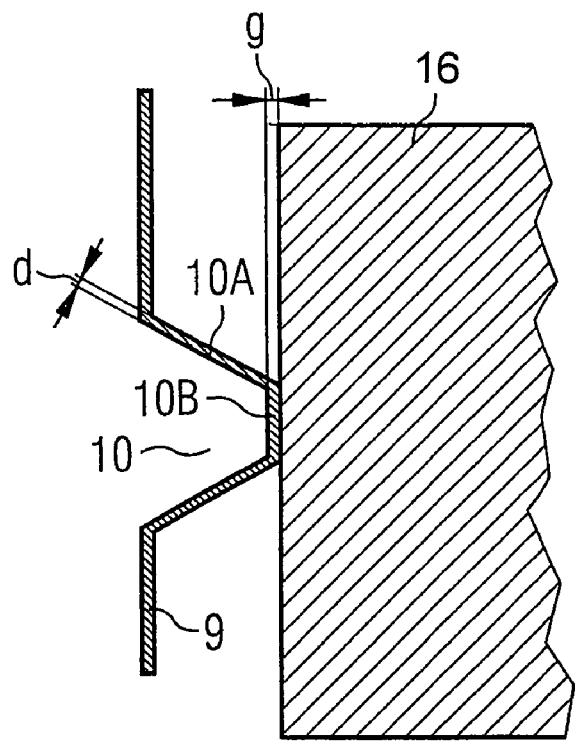
FIG. 7A is a fragmentary, enlarged, cross-sectional view of a prior art cell having a wide bead to be compressed according to the method of the present invention.

FIG. 7A shows a broad bead 10, in which the wall thickness d of its flanks 10A is smaller than the wall thickness g of its base 10B. Such wide beads, which are made by using the traditional beading methods, are not so well-suited to be used for the compression process according to the invention in method step C).

Figure 7B:
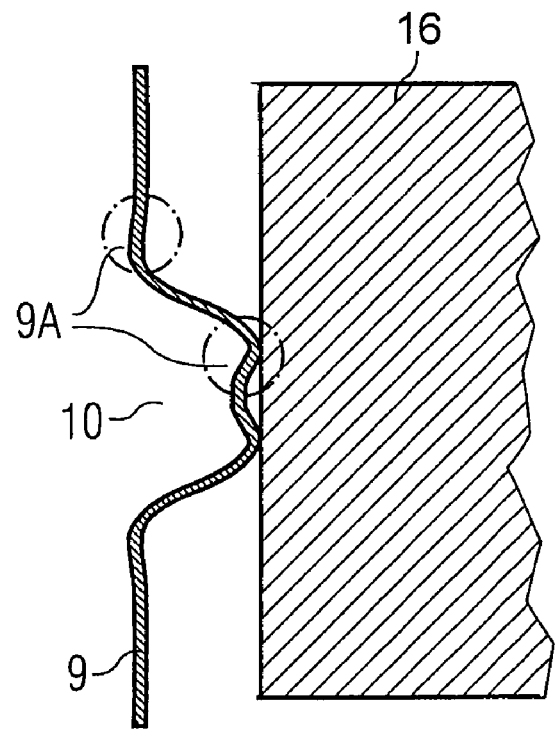
FIG. 7B is a fragmentary, enlarged, cross-sectional view of the prior art cell of FIG. 7A after compression according to the method of the present invention.

FIG. 7B shows the traditional bead 10 depicted in FIG. 7A after such a compression process takes place in method step C). It can be seen that the deformations 9A occur both in the walls 9 as well as in the bead 10.

Figure 8A:
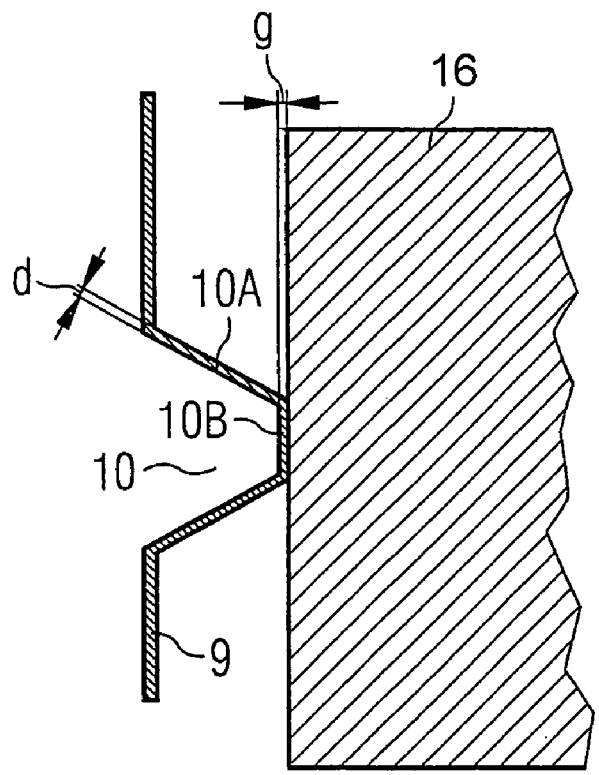
FIG. 8A is a fragmentary, enlarged, cross-sectional view of a cell according to the invention with a wide bead to have applied thereon a compression beading process according to the invention.

FIG. 8A shows a first indentation 10 in cross-section, which was generated in the method step A) of the method according to the invention. Here, intensive beading can be done using a beading tool, for example, with the base 10B of the bead 10 being supported by a counterforce, for example, an anvil. This gives rise to a first bead 10, whose wall thickness d at the flanks 10A is approximately the same size as its wall thickness g in the bead background 10B.

Figure 8B:
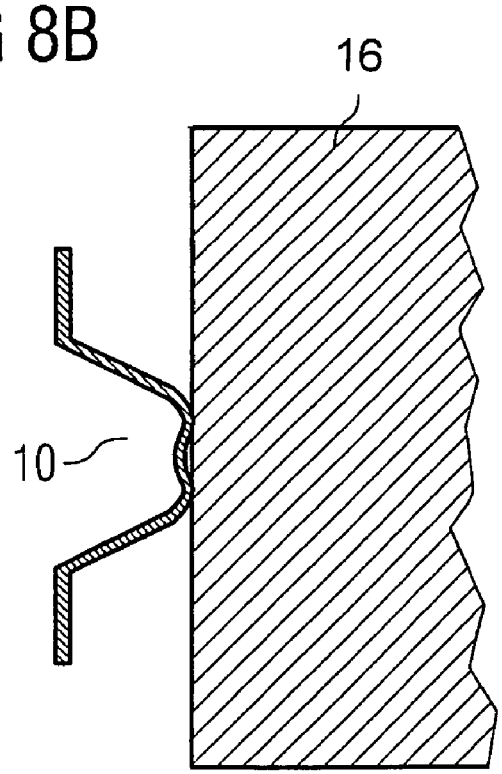
FIG. 8B is a fragmentary, enlarged, cross-sectional view of the cell of FIG. 8A after having applied thereon the compression beading process according to the invention.

FIG. 8B shows the bead depicted in FIG. 8A after the compression process in method step C). What can be clearly seen is that, in contrast to FIG. 7B, there is hardly any or no deformation on the bead 10 or on the walls 9 of the cup. Accordingly, a particularly good fixing of the capacitor coil 16 can be achieved.

The method according to the invention depicted here as well as the electrochemical cells according to the invention are not limited to the embodiments shown here. Other variants are possible, in particular, with respect to the shape of the indentations.

I claim:

1. An electrochemical cell, comprising:
   a cup-shaped housing defining an interior;
   an electrode stack disposed in said interior of said housing; and
   said housing having at least a first and a second indentation, said first indentation fixing said electrode stack in said interior and having flanks with an average wall thickness $d_{mean}$, with:

$$d_{mean} > a_{mean} \cdot \cos \alpha$$

where:
   $a_{mean}$ is an average wall thickness of remaining portions of said housing; and
   α is an angle of inclination of said flanks;
   said second indentation having second flanks with a second angle of inclination; and
   said angle of inclination α being greater than said second angle of inclination.

2. The electrochemical cell according to claim 1, wherein said angle of inclination α of said flank of said first indentation is greater than 50°.

3. The electrochemical cell according to claim 1, wherein said angle of inclination α of at least one of said flanks of said first indentation is greater than 50°.

4. The electrochemical cell according to claim 1, wherein said angle of inclination α of said first indentation is greater than 90°.

5. The electrochemical cell according to claim 1, wherein:
   said housing and said electrode stack form an aluminum electrolyte capacitor;
   said electrode stack is a capacitor coil having a separator, an electrolyte, and two aluminum foils as electrodes; and
   said electrodes are isolated from one another by said separator and are in contact with said electrolyte.

6. The electrochemical cell according to claim 1, wherein said flanks of said first indentation are at a distance from one another.

7. The electrochemical cell according to claim 6, wherein said distance of said flanks from one another increases with increasing distance from said electrode stack.

8. The electrochemical cell according to claim 1, wherein:
   said housing defines an opening and has a housing bottom;
   a lid closes said opening of said housing; and
   said electrode stack is fixed between said lid and said housing bottom.

* * * * *